United States Patent

Moore

Patent Number: 5,280,848
Date of Patent: Jan. 25, 1994

[54] MOTOR VEHICLE INTERIOR FITTING

[75] Inventor: Colin E. Moore, Solihull, England

[73] Assignee: Rover Group Limited, England

[21] Appl. No.: 870,396

[22] Filed: Apr. 17, 1992

[30] Foreign Application Priority Data

Apr. 23, 1991 [GB] United Kingdom ............... 9108626.4

[51] Int. Cl.$^5$ ................................................ B60R 7/00
[52] U.S. Cl. ...................................... 224/282; 224/275;
224/42.42; 220/264; 220/332; 220/333;
248/311.2
[58] Field of Search ............... 224/273, 275, 280, 281,
224/282, 42.42, 42.43, 42.44; 296/37.1, 37.8,
37.15; 220/264 X, 331, 332 X, 333 X; 108/14,
45, 25; 312/319.2; 297/194, 283; 248/311.2 X,
293

[56] References Cited

U.S. PATENT DOCUMENTS

| | | |
|---|---|---|
| 1,100,272 | 6/1914 | Turney ................................ 297/283 |
| 1,625,011 | 4/1927 | Wolfe et al. .................... 224/282 X |
| 3,132,892 | 5/1964 | Stevens ........................... 224/282 X |
| 4,889,257 | 12/1989 | Steffes ................................ 220/331 |
| 5,018,633 | 5/1991 | Toth et al. .................... 224/42.42 X |

FOREIGN PATENT DOCUMENTS

| | | |
|---|---|---|
| 0219632 | 4/1987 | European Pat. Off. ....... B60R 7/04 |
| 3143957 | 5/1983 | Fed. Rep. of Germany ...... 297/194 |
| 59036 | 5/1980 | Japan ................................... 224/282 |
| 3-276832 | 12/1991 | Japan .................................. 296/37.8 |
| 4-63739 | 2/1992 | Japan .................................. 296/37.8 |

*Primary Examiner*—Henry J. Recla
*Assistant Examiner*—Glenn T. Barrett
*Attorney, Agent, or Firm*—Davis, Bujold & Streck

[57] ABSTRACT

A fitting comprising a compartment in a vehicle center console. A lid has one (normally upper) surface and another (normally lower) surface which is configured as a cup holder. The lid is pivoted mid-way between its ends on a U-shaped member having arms which can support the lid in a raised position. Spring struts keep the lid in the raised position and, by virtue of a pivot pin offset from the lid pivot pin, provide an overcenter action when the lid is rotated through approximately 180 degrees, to bring the other surface uppermost. In a first modification the pivots of the U-shaped member and the struts are arranged to bias the lid in the downward direction when it is lowered with its one (normally upper) surface uppermost. In a second modification the spring struts pivot about the same pivot axis as the lid and there is no overcenter action.

18 Claims, 5 Drawing Sheets

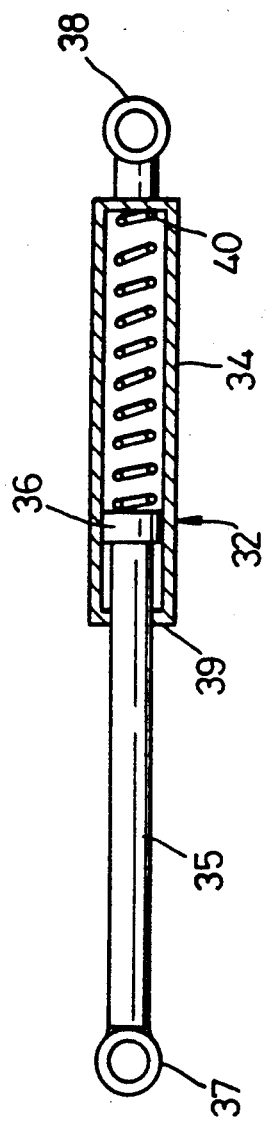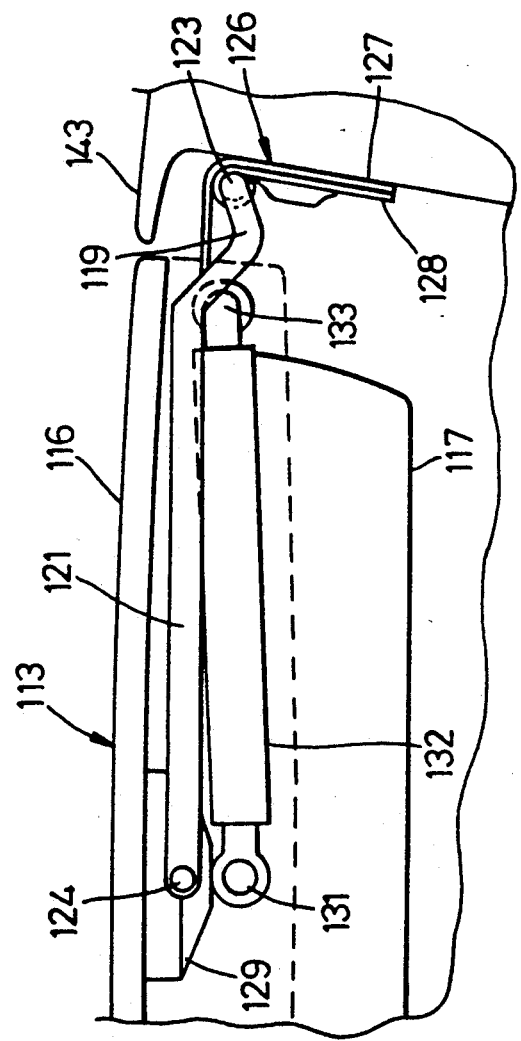

MOTOR VEHICLE INTERIOR FITTING

The invention relates to motor vehicle interior fittings of the kind comprising a fitment and a lid for the fitment, the lid having one, normally upper, surface and another, normally lower, surface such that the lid has one mode when in one position with said one surface uppermost and has another mode when in another position with said other surface uppermost.

Thus the lid can, for example, when in said one position, act as a cover, and can, when in said other position, have utility as a receptacle or platform.

EP-A-0219632 describes a fitting of the kind described above. However, the lid acts to cover only one half of the fitment when in any one of its two positions.

It is thus an object of the invention to provide a motor vehicle interior fitting which comprises a fitment and a lid for the fitment wherein the lid can be used with either surface uppermost whilst being effective to cover the fitment.

According to the invention there is provided a motor vehicle interior fitting comprising a fitment, a lid for the fitment, the lid having one, normally upper, surface and another, normally lower, surface such that the lid has one mode when in one position with said one surface uppermost and has another mode when in another position with said other surface uppermost and hinge means for the lid including first pivot means arranged to allow the lid to be pivoted from said one position about a first pivot axis adjacent an end margin of the lid, support means for supporting the lid at a raised position above said one and said other positions and second pivot means arranged so that the lid can be pivoted about a second pivot axis and subsequently be pivoted about the first pivot axis to bring the lid into said other position.

Advantageously the hinge means includes support means for supporting the lid at a raised position above said one and said other positions and comprises second pivot means arranged so that the lid can be pivoted about a second pivot axis and subsequently be pivoted about the first pivot axis to bring the lid into said other position. The second pivot axis is preferably parallel to the first pivot axis and spaced intermediate two end margins of the lid.

The support means may comprise an arm arranged transverse to the first and second pivot axes, in which case one of said pivot means may comprise a pivot pin on the arm. Preferably the pivot pin is formed integral with the arm which conveniently may be of round section bar.

Two of said arms may be arranged on either side of the lid and are preferably joined at or adjacent one end of each arm by a cross-bar. The cross-bar conveniently forms a pivot pin of one of said pivot means and may be formed integral with the arms. In that case, as previously suggested, the arms and the cross-bar are conveniently made of round section bar.

Conveniently the support means comprises biassing spring means to bias the lid towards its raised position. Alternatively or additionally the support means may comprise friction means to resist movement of the lid about the first pivot axis.

The support means may comprise an extensible support operatively connected between the fitment and the lid. The support may have an indirect connection to the lid, for example by being connected to the arm. The extensible support conveniently comprises extension limiting means for limiting the extension of the extensible support and thereby determining the raised position of the lid.

The biassing spring means may be incorporated in the extensible support, in which case the biassing spring means is preferably arranged to bias the extensible support towards its extended state. Alternatively or additionally the friction means may be incorporated in the extensible support.

Preferably, third pivot means are provided and arranged so that the extensible support is pivotal on the fitment about a third pivot axis which is parallel to the first pivot axis and spaced laterally therefrom, in which case the third pivot axis may be positioned to provide a maximum compression of the extensible support when the lid is at or near said one position. Where the extensible support incorporates the biassing spring, this ensures that the biassing spring exerts little or no upward bias on the lid when the lid is in its lowermost position.

However, an alternative is to arrange the third pivot means so that the third pivot axis is positioned to provide maximum compression of the extensible support when the lid is above said one position so that the biassing spring can exert a downward biassing force on the lid when the lid is in said one position.

A friction device may be provided for resisting pivotal movement of the lid about the second pivot axis.

The support means may comprise stop means to limit pivotal movement of the lid about the second pivot axis between one predetermined angular position and another predetermined angular position, in which case overcenter spring means may be provided to be operative to bias the lid towards each of said predetermined angular positions away from an intermediate angular position in which the overcenter spring means is ineffective.

Conveniently, the overcenter spring means is operative in compression between the lid and either the hinge means or the fitment.

A pivotal connection may be provided on the lid to define a fourth pivot axis laterally spaced from the second pivot axis, a telescopic strut being connected between the pivotal connection and either the hinge means or the fitment.

Preferably the strut comprises the overcenter spring means and/or the friction means.

Conveniently the strut and the extensible support are combined in a single unit. Similarly, the friction means and the friction device may be combined and/or the biassing spring means and the overcenter spring means are combined.

The lid may have one or more lateral extensions to cover the hinge means when the lid is in said one position, in which case the stop means may include the or each lateral extension.

The hinge means may comprise a parallelogram linkage which may comprise two pairs of arms. This would keep the lid horizontal when being raised from its said one or said other positions.

Said other surface of the lid is conveniently configured as cup holding means for laterally locating one or more beverage containers.

The fitment may comprise an oddment compartment in, for example, a center console of the vehicle. This compartment may conveniently include storage slots for recorded media, eg audio tape cassettes or optical discs.

The invention, including other aspects thereof, will now be described by way of example and with reference to the accompanying drawings, of which:

FIG. 5 is a cross-section of a spring strut shown in FIG. 1;

FIG. 6 is a view based on a partial view of FIG. 1 but on an enlarged scale and showing a modification.

Figure 1:
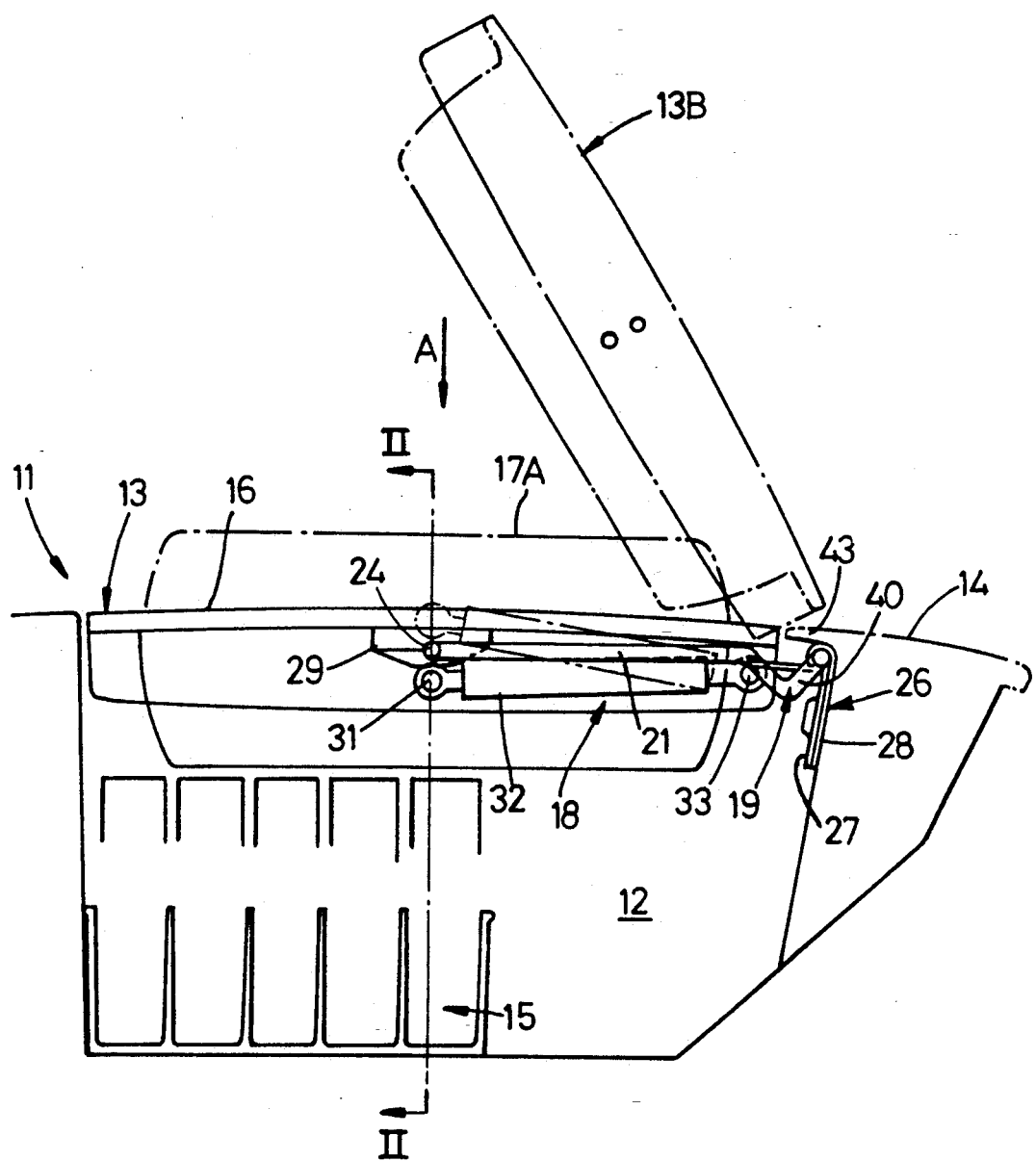
FIG. 1 is a cross-section of a motor vehicle interior fitting according to the invention.

Referring to FIGS. 1 to 5, the motor vehicle interior fitting 11 comprises a fitment in the form of an oddment compartment or bin 12 having a lid 13. The compartment 12 forms part of a centre console 14 of a motor vehicle interior, being situated between the driver's and front passenger's footwells and includes storage slots 15 for recorded media such as audio tape cassettes.

The lid 13 has one, normally upper, surface 16 which is generally smooth and slightly convex to blend in with the console 14 and another, normally lower, surface 17.

Figure 4:
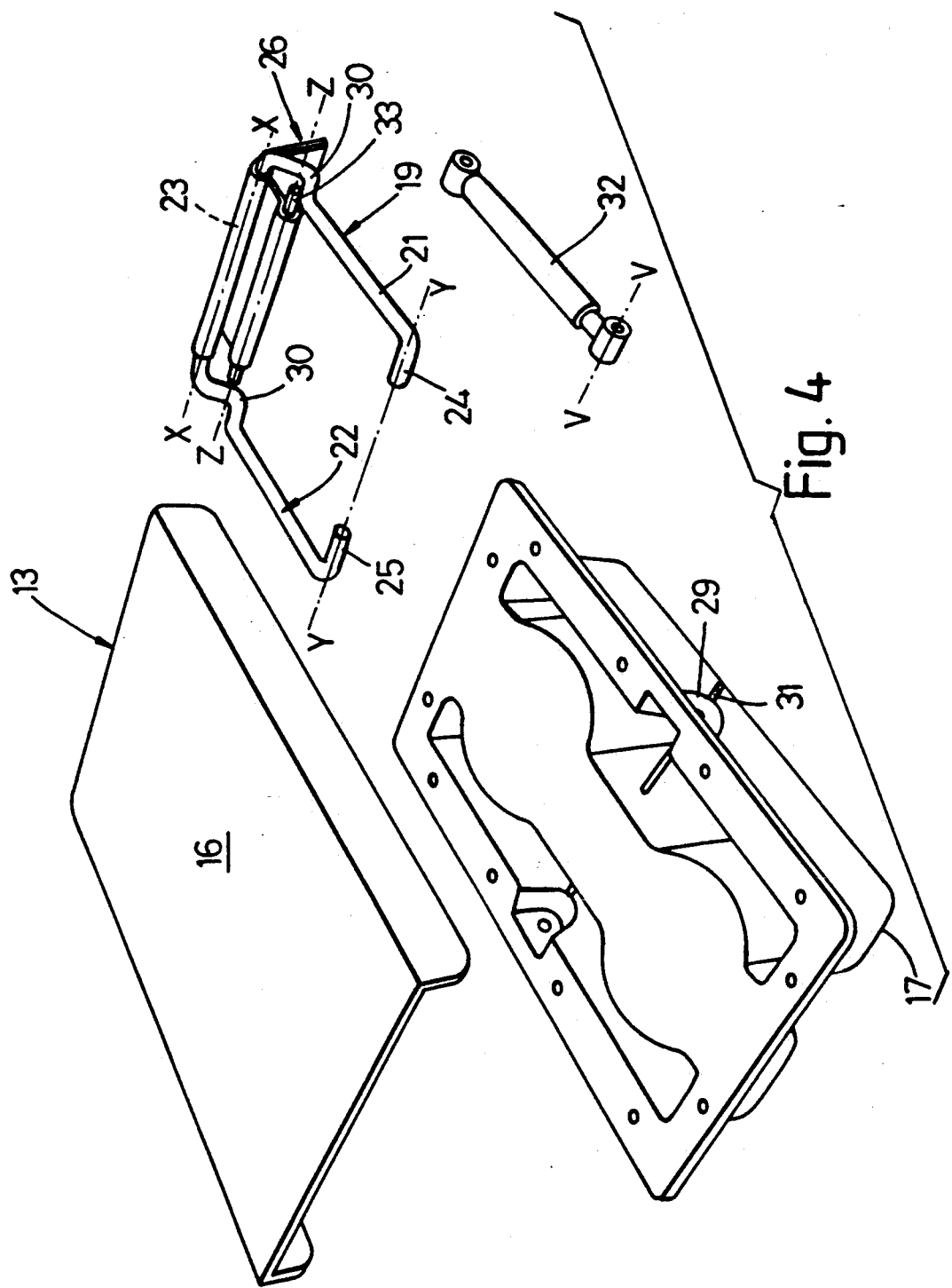
FIG. 4 is a perspective exploded view of parts of a lid and hinge means shown in FIGS. 1 to 3.

The lid 13 is formed from two plastics moldings joined together by screws or other conventional fixing means (see FIG. 4).

The upper molding has the surface 16 and the lower molding forms the surface 17.

The lid 13 has two modes. In one mode, when the lid 13 is in one position with the upper surface 16 uppermost, as shown in full lines in FIGS. 1 to 3, the lid covers the compartment 12. In the other mode, when the lid 13 is in another position with the lower surface 17 uppermost, as indicated by the dotted line 17A in FIG. 1, the lid provides a substantially horizontal receptacle or platform. The lower surface 17 is configured as cup holding means by having two circular recesses 10 interrupted by a longitudinal groove 20.

Hinge means for the lid 13 is indicated generally at 18 and include a U-shaped member 19 of round section bar. The member 19 comprises two arms 21 and 22 arranged on either side of the lid 13 and joined at one end of each arm by a cross-bar 23. At the other end of each arm 21 and 22 there is an integral pivot pin 24 and 25 respectively.

The cross-bar 23 also acts as a pivot pin and is located for pivotal movement about a first pivot axis adjacent an end margin of the lid 13 by a hinge bracket 26. The hinge bracket 26 comprises two sheet metal members 27 and 28. Member 27 is of generally L-section and member 28 is generally flat with a rolled edge which forms a U-shaped recess to locate the cross-bar 23, the recess being closed by member 27 adjacent the 90 degree bend. The members 27 and 28 are secured together by spot welding and fastened to an end wall of the compartment 12 by screws.

The pivot pins 24 and 25 each locate in a respective one of a pair of brackets 29 attached to the underside of the lid 13 approximately mid-way between the end margins of the lid. The brackets 29 also locate a pivot pin 31 which extends across the lid and provides pivots for one end of a pair of spring struts 32.

The other end of each spring strut 32 is pivoted on another pivot pin 33 which is located in a rolled over edge of the hinge bracket member 27.

Each spring strut 32 comprises a cylinder 34 in which a plunger 35 is slidable. The plunger 35 has a head 36 at one end and a bush 37 at the other end which is pivotal on pivot pin 31. The cylinder 34 is closed at one end where it has a bush 38 which is pivotal on pivot pin 33 and has an end flange 39 at the other end to provide a sliding fit on the plunger 35 and prevent its removal. A helical compression spring 40 acts between the plunger head 36 and the closed end of the cylinder 34.

Figure 2:
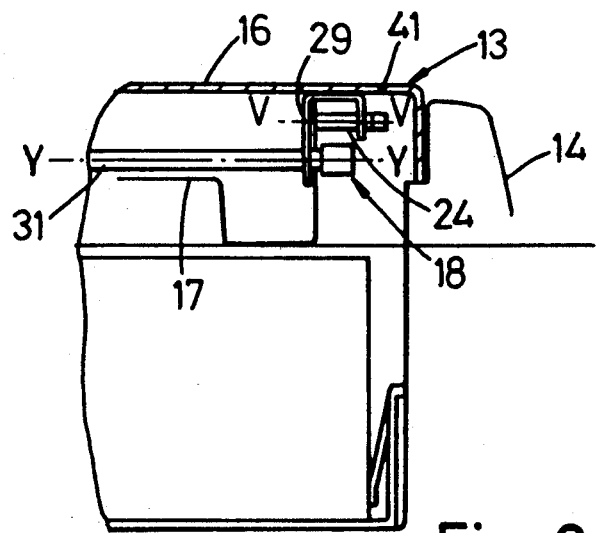
FIG. 2 is a cross-section on the line II—II in FIG. 1.
Figure 3:
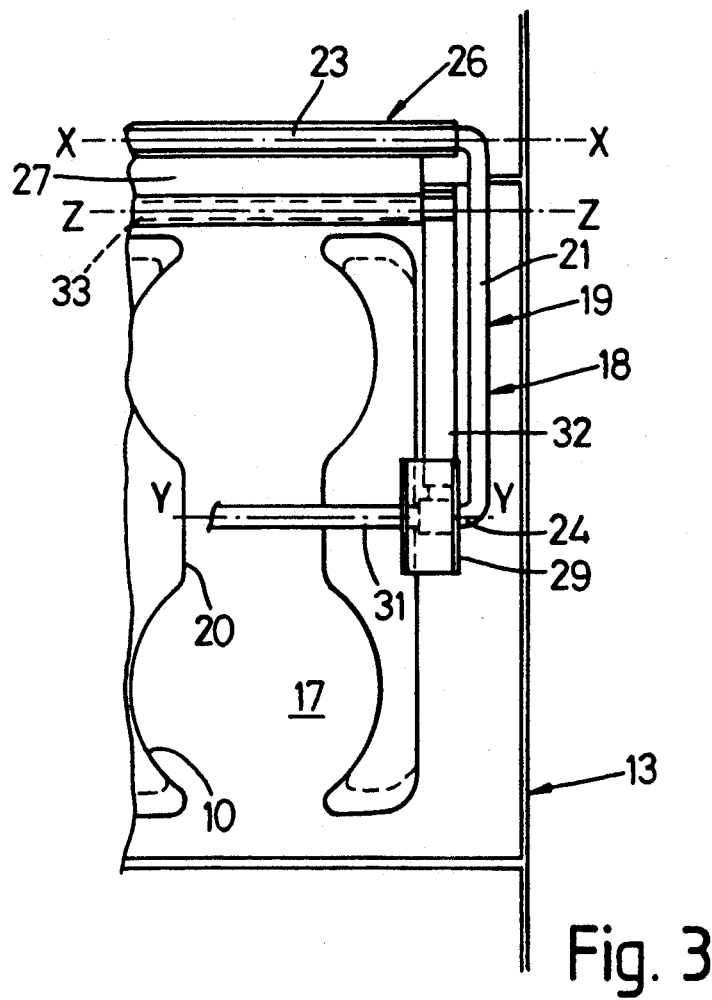
FIG. 3 is a view on arrow A in FIG. 1.

When in the one position shown in full lines in FIGS. 1 to 3 (said one mode), the lid 13 also covers the hinge means 18, there being lateral extensions 41 of the lid and substantially vertical side walls 42 formed integral with the upper molding. The lower edge of the side walls 42 rest on ledges 44 in the side wall of the compartment 12 to support the lid.

The hinge means 18 is also covered by an overhanging edge 43 of the console 14. Clearance for this edge 43 is provided on each arm 21 and 22 by a dog leg double bend 30.

From the position shown in full lines in FIG. 1, the lid 13 can be pivoted about the first pivot axis X-X defined by the cross-bar 23 of the U-shaped member 19 by lifting the edge of the lid furthest from the cross-bar. Initial movement of the lid 13 will also cause it to pivot about a second pivot axis Y-Y defined by the common axis of integral pins 24 and 25 until the undersides of the lid extensions 41 contact the arms 21 and 22. The lid 13 and the U-shaped member 19 then continue to rotate about the pivot axis X-X of cross-bar 23. During this pivotal movement, the spring struts 32 extend and thus act as extensible supports, the compression springs 40 acting as biassing spring means to bias the lid towards a raised position.

The raised position of the lid 13 is determined by extension limiting means in each strut 32, which means comprises the plunger head 36 forming an abutment with the cylinder flange 39.

Pivot pin 33 is positioned to provide a third pivot axis Z-Z which is parallel to the first pivot axis of cross-bar 23 and spaced laterally from it. This provides maximum compression of the struts 32 and minimises the upward bias provided by the strut when the lid is in the one position indicated in full lines in FIGS. 1 to 3.

When in the raised position as indicated generally at 13B in FIG. 1, the lid can be pivoted about the second pivot axis Y-Y of pins 24 and 25 which is parallel to and laterally spaced from the first pivot axis X-X of crossbar 23. This allows the lid to be brought into its second mode where surface 17 is uppermost. To do this the lid 13 has to be turned counterclockwise as seen in FIG. 1 by pulling the edge close to the cross-bar 23 away from one predetermined angular position where the undersides of the lid extensions 41 abut the arms 21 and 22 to act as stop means which limits pivotal movement of the lid about the second pivot axis Y-Y of pivot pins 24 and 25 in one direction. Further, counterclockwise pivoting of the lid 13 brings it into another predetermined angular position where the upper surfaces of the lid extensions 41 contact the arms 21 and 22.

During the limited pivotal movement of the lid 13 about the second pivot axis Y-Y, as described above, the spring struts 32 pivot about a fourth pivot axis V-V defined by pivot pin 31, this axis being laterally spaced from the second pivot axis Y-Y. This compresses the spring struts 32 so that the compression springs 40 act as overcenter spring means which bias the lid towards each of the predetermined angular positions, there being an intermediate angular position where the second pivot axis Y-Y is intersected by the line of action of the biassing force of the springs where they are ineffective to bias the lid.

Once in the second predetermined angular position with the upper surfaces of the lid extensions 41 abutting the arms 21 and 22, the lid and the U shaped member 19 can be pivoted downwardly about the first pivot axis Y-Y of the cross bar 23 against the bias of the struts 32 which approach maximum compression as the lid reaches its other lowered position with surface 17 uppermost. In this position the upper side margins of the lid rest on the ledges 44 to support the lid.

Although one arm could be used instead of two arms joined as part of a U-shaped member, this is preferred since it provides stability when the lid is in its raised position. Whilst the spring struts act both as biassing spring means to bias the lid into its raised position and as overcenter spring means, these functions may be embodied in separate units or in other forms of spring, eg helical torsion springs.

Where separate struts are employed in the biassing and overcenter spring functions, then alternative pivot axis are possible. For example, where the strut acts solely as an overcenter spring means, it can act between the lid and the arm. Also, where the strut acts solely as a biassing spring means it can act between the console and the arm.

If desired, two sets of arms may be used to give a parallelogram linkage. For example, two U-shaped members may be used, laterally displaced one from the other.

In addition to or instead of springs, friction means may be used to support the lid in its raised position or to keep it in its lowered positions. For example, each strut could incorporate a resilient ring in the head of the plunger.

In the modification shown in FIG. 6, parts which are identical or similar to those shown in FIGS. 1 to 5 have the same reference numeral with the addition of 100. The essence of the modification is that the first axis of cross-bar 123 is lower than the line of action of the strut 132 so that maximum compression of the strut occurs when the lid is above its lowered position with surface 116 uppermost. This means that when the lid is in lowered position the struts 132 exert a downward biassing force which helps to retain the lid in position if the vehicle is travelling over exceptionally bumpy ground.

Figure 7:
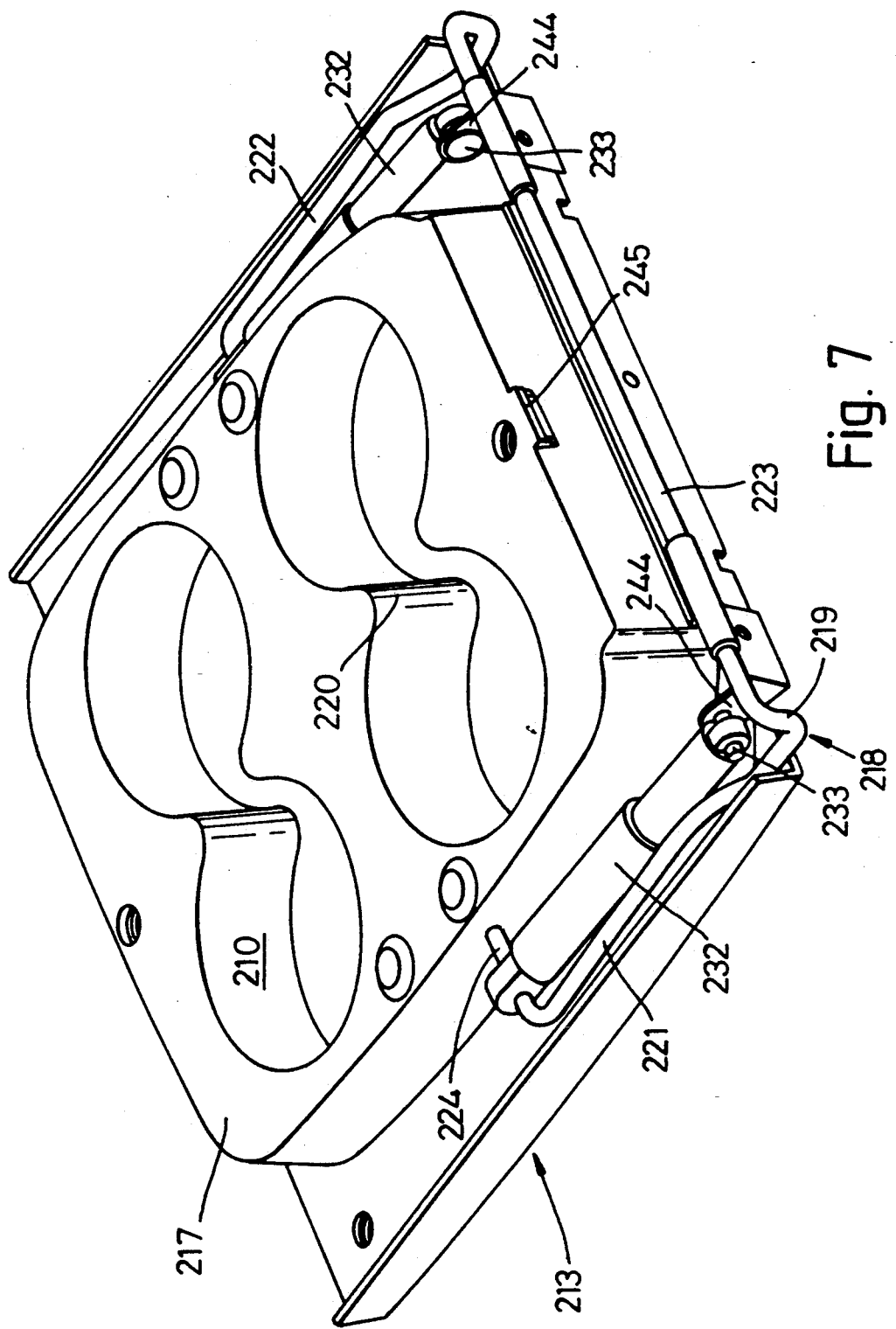
FIG. 7 is a perspective view showing a further modification.

In the further modification shown in FIG. 7, parts which are identical or similar to those shown in FIGS. 1 to 5 have the same reference numeral with the addition of 200. In this modification the normally lower surface 217 has two pairs of circular recesses 210 each pair being joined at a respective groove 220.

A pair of spring struts 232 are generally similar to the struts 32 but are charged with gas under pressure to use the gas as the spring medium. However, whilst the spring strut shown in FIGS. 1 to 5 is pivoted on the pivot pin 31 about the fourth pivot axis V-V laterally spaced from the second pivot axis Y-Y defined by the integral pins 24 and 25, in the modification shown in FIG. 7 the spring struts are pivoted on the integral pins 224 and 225.

The other end of each spring strut 232 is pivoted on a respective pin 233A and 233B carried on lugs 244.

Operation of the lid 213 is similar to that of lid 13, except that there is no overcenter action by the spring struts 232 to bias the lid towards each of the predetermined angular positions. To help keep the lid in place when the vehicle is subjected to high vertical accelerations, a lip 245 is provided on the lid to cooperate with a spring loaded latch on the console.

I claim:

1. A motor vehicle interior fitting comprising a fitment defining an open-topped compartment, a lid for the fitment, the lid having one, normally upper, surface and another, normally lower, surface such that the lid has one mode when in one position on the fitment with said one surface uppermost and has another mode when in another position on the fitment with said other surface uppermost and hinge means operatively connecting the lid to the fitment, said hinge means including first pivot means arranged to allow the lid to be pivoted from said one position about a first pivot axis adjacent an end margin of the lid, support means for supporting the lid at a raised position above said one and said other positions and second pivot means arranged so that the lid can be pivoted about a second pivot axis parallel to the first pivot axis and spaced intermediate two end margins of the lid and can subsequently be pivoted about the first pivot axis to bring the lid into said other position, said support means comprising a pair of arms arranged transverse to the first and second pivot axes one on each side of the lid and joined at one end of each arm by a cross-bar which forms a pivot pin of one of said pivot means.

2. A fitting as claimed in claim 1, wherein one of said pivot means comprises a pivot pin on each arm.

3. A fitting as claimed in claim 2, wherein each pivot pin is formed integral with the respective arm.

4. A fitting as claimed in claim 1, wherein the cross-bar is integral with the arms.

5. A motor vehicle interior fitting comprising a fitment defining an open-topped compartment, a lid for the fitment, the lid having one, normally upper, surface and another, normally lower, surface such that the lid has one mode when in one position on the fitment with said one surface uppermost and has another mode when in another position on the fitment with said other surface uppermost and hinge means operatively connecting the lid to the fitment, said hinge means including first pivot means arranged to allow the lid to be pivoted from said one position about a first pivot axis adjacent an end margin of the lid, support means for supporting the lid at a raised position above said one and said other positions and second pivot means arranged so that the lid can be pivoted about a second pivot axis and can subsequently be pivoted about the first pivot axis to bring the lid into said other position, the support means further comprising biasing spring means to bias the lid towards its raised position.

6. A fitting as claimed in claim 5 wherein the support means further comprising an extensible support operatively connected between the fitment and the lid and the biasing spring means being located in the extensible support to bias the lid towards its raised position.

7. A fitting as claimed in claim 6, wherein the extensible support further comprises friction means operative to support the lid in a raised position.

8. A fitting as claimed in claim 6 further comprising third pivot means arranged so that the extensible support is pivotal on the fitment about a third pivot axis which is parallel to the first pivot axis and spaced laterally therefrom, and a pivotal connection on the lid which defines a fourth pivot axis laterally spaced from the second pivot axis, the extensible support being connected between the pivotal connection and the fitment.

9. A fitting as claimed in claim 6, wherein the extensible support comprises further comprises extension limiting means for limiting the extension of the extensible support and thereby determining highest raised position of the lid.

10. A fitting as claimed in claim 6, wherein the biassing spring means acts to bias the extensible support towards an extended state.

11. A motor vehicle interior fitting comprising a fitment defining an open-topped compartment, a lid for the fitment, the lid having one, normally upper, surface and another, normally lower, surface such that the lid has one mode when in one position on the fitment with said one surface uppermost and has another mode when in another position on the fitment with said other surface uppermost and hinge means operatively connecting the lid to the fitment, said hinge means including first pivot means arranged to allow the lid to be pivoted from said one position about a first pivot axis adjacent an end margin of the lid, support means for supporting the lid at a raised position above said one and said other positions and second pivot means arranged so that the lid can be pivoted about a second pivot axis and can subsequently be pivoted about the first pivot axis to bring the lid into said other position, the support means further comprising an extensible support operatively connected between the fitment and the lid and comprising third pivot means arranged so that the extensible support is pivotal on the fitment about a third pivot axis which is parallel to the first pivot axis and spaced laterally therefrom.

12. A fitting as claimed in claim 11 wherein the extensible support further comprises a spring bias means and the third pivot axis being positioned to provide maximum compression of the extensible support when the lid is above said one position so that the spring bias means can exert a downward biasing force on the lid when the lid is in said one position.

13. A fitting as claimed in claim 11, wherein the third pivot means is arranged so that the third pivot axis is positioned to provide maximum compression of the extensible support when the lid is at or near said one position.

14. A motor vehicle interior fitting comprising a fitment defining an open-topped compartment, a lid for the fitment, the lid having one, normally upper, surface and another, normally lower, surface such that the lid has one mode when in one position on the fitment with said one surface uppermost and has another mode when in another position on the fitment with said other surface uppermost and hinge means operatively connecting the lid to the fitment, said hinge means including first pivot means arranged to allow the lid to be pivoted from said one position about a first pivot axis adjacent an end margin of the lid, support means for supporting the lid at a raised position above said one and said other positions and second pivot means arranged so that the lid can be pivoted about a second pivot axis and can subsequently be pivoted about the first pivot axis to bring the lid into said other position, the support means comprising stop means to limit pivotal movement of the lid about the second pivot axis between one predetermined angular position and another predetermined angular position, and further comprising overcenter spring means operative to bias the lid towards each of said predetermined angular positions away from an intermediate angular position in which the overcenter spring means is ineffective.

15. A fitting as claimed in claim 14, wherein the overcentre spring means is operative in compression between the lid and one of the hinge means and the fitment.

16. A motor vehicle interior fitting comprising a fitment defining an open-topped compartment, a lid for the fitment, the lid having one, normally upper, surface and another, normally lower, surface such that the lid has one mode when in one position on the fitment with said one surface uppermost and has another mode when in another position on the fitment with said other surface uppermost and hinge means operatively connecting the lid to the fitment, said hinge means including first pivot means arranged to allow the lid to be pivoted from said one position about a first pivot axis adjacent an end margin of the lid, support means for supporting the lid at a raised position above said one and said other positions and second pivot means arranged so that the lid can be pivoted about a second pivot axis and can subsequently be pivoted about the first pivot axis to bring the lid into said other position, a pivotal connection on the lid defining a fourth pivot axis laterally spaced from the second pivot axis and a telescopic strut being operatively connected between the pivotal connection and the fitment.

17. A fitting as claimed in claim 16, wherein the telescopic strut includes a friction device operative to support the lid in a raised position.

18. A motor vehicle interior fitting comprising a fitment defining an open-topped compartment, a lid for the fitment, the lid having one, normally upper, surface and another, normally lower, surface such that the lid has one mode when in one position on the fitment with said one surface uppermost and has another mode when in another position on the fitment with said other surface uppermost and hinge means operatively connecting the lid to the fitment, said hinge means including first pivot means arranged to allow the lid to be pivoted from said one position about a first pivot axis adjacent an end margin of the lid, support means for supporting the lid at a raised position above said one and said other positions and second pivot means arranged so that the lid can be pivoted about a second pivot axis and can subsequently be pivoted about the first pivot axis to bring the lid into said other position, the lid covering the hinge means when the lid is in said one position and acting as stop means to limit pivotal movement of the lid about the second pivot axis between one predetermined angular position and another predetermined angular position.

* * * * *